US009064229B2

(12) United States Patent
Chaves et al.

(10) Patent No.: US 9,064,229 B2
(45) Date of Patent: *Jun. 23, 2015

(54) REAL-TIME ASSET TRACKING USING DISCOVERY SERVICES

(75) Inventors: Leonardo Weiss F. Chaves, Karlsruhe (DE); Florian Kerschbaum, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,278

(22) Filed: May 7, 2012

(65) Prior Publication Data

US 2013/0297929 A1    Nov. 7, 2013

(51) Int. Cl.
| | |
|---|---|
| *H04L 9/00* | (2006.01) |
| *H04L 9/28* | (2006.01) |
| *H04L 9/08* | (2006.01) |
| *G06Q 10/08* | (2012.01) |
| *H04L 29/06* | (2006.01) |
| *G06F 21/62* | (2013.01) |
| *H04L 9/30* | (2006.01) |

(52) U.S. Cl.
CPC .......... *G06Q 10/087* (2013.01); *H04L 63/0442* (2013.01); *H04L 63/062* (2013.01); *G06F 21/6218* (2013.01); *H04L 9/0866* (2013.01); *H04L 9/0844* (2013.01); *H04L 9/3073* (2013.01); *H04L 2209/805* (2013.01)

(58) Field of Classification Search
CPC ............ G06F 21/6218; H04L 63/0442; H04L 9/0866; H04L 63/062; H04L 2209/805
USPC .............................................. 713/150; 380/44
See application file for complete search history.

(56) References Cited

U.S. PATENT DOCUMENTS

| | | | |
|---|---|---|---|
| 6,738,900 B1* | 5/2004 | Hardjono et al. ............. | 713/156 |
| 2003/0172280 A1* | 9/2003 | Scheidt et al. ................ | 713/182 |
| 2009/0106562 A1* | 4/2009 | Lee ............................... | 713/193 |
| 2009/0150467 A1* | 6/2009 | Neumann et al. ............. | 708/254 |
| 2009/0177888 A1* | 7/2009 | Asano et al. .................. | 713/171 |
| 2009/0323928 A1* | 12/2009 | Kerschbaum et al. ......... | 380/28 |

(Continued)

OTHER PUBLICATIONS

Michel Abdalla et al., "Searchable Encryption Revisited: Consistency Properties, Relation to Anonymous IBE, and Extensions," Proceedings of the 25th Annual International Cryptology Conference, CRYPTO'05, Aug. 2005, 17 pages.

(Continued)

*Primary Examiner* — Linglan Edwards
(74) *Attorney, Agent, or Firm* — Fish & Richardson P.C.

(57) ABSTRACT

Implementations of the present disclosure are directed to sharing data in a supply chain, the data corresponding to an item having a tag associated therewith. Methods include storing item-level data in a computer-readable repository, determining endpoint data, the endpoint data indicating a location of the item-level data, determining a random number from the tag, the random number unique to the item, selecting a first integer and a second integer, generating a first public key based on the first integer and a semi-public key based on the second integer, generating an identifier based on the first public key and the random number, generating a key based on the semi-public key and the random number, encrypting the endpoint data using the key to provide encrypted endpoint data, defining a tuple comprising the identifier and the encrypted endpoint data, and transmitting the tuple over a network for storage in a persistent storage device.

20 Claims, 6 Drawing Sheets

(56) References Cited

U.S. PATENT DOCUMENTS

2009/0323972 A1* 12/2009 Kohno et al. ............... 380/284
2010/0172502 A1* 7/2010 Jones et al. ............... 380/277

OTHER PUBLICATIONS

Rakesh Agrawal et al., "Towards Traceability across Sovereign, Distributed RFID Databases," Proceedings of the 10th International Database Engineering and Applications Symposium, IDEAS'06, Dec. 2006, 11 pages.
Steve Beier et al., "Discovery Services—Enabling RFID Traceability in EPCglobal Networks," Proceedings of the 13th International Conference on Management of Data, COMAD'06, Dec. 2006, 4 pages.
Mihir Bellare et al., "Deterministic and Efficiently Searchable Encryption," Proceedings of the 27th International Cryptology Conference, CRYPTO'07, Aug. 2007, 18 pages.
Dan Boneh et al., "Short Signatures from the Weil Pairing," Proceedings of the 7th International Conference on the Theory and Application of Cryptology and Information Security, ASIACRYPT'01, Dec. 2001, 24 pages.
Dan Boneh et al., "Public Key Encryption with Keyword Search," Proceedings of the 23rd Annual International Conference on the Theory and Applications of Cryptographic Techniques, EUROCRYPT'04, Lecture Notes in Computer Science 3027, May 2004, 15 pages.
Alberto Ceselli et al., "Modeling and Assessing Inference Exposure in Encrypted Databases," ACM Transactions on Information and System Security, vol. 8, No. 1, Feb. 2005, pp. 119-152.
Reza Curtmola et al., "Searchable Symmetric Encryption: Improved Definitions and Efficient Constructions," Proceedings of the 13th Conference on Computer and Communications Security, CCS'06, Nov. 2006, 10 pages.
Ernesto Damiani et al., "Balancing Confidentiality and Efficiency in Untrusted relational DBMSs," Proceedings of the 10th ACM Conference on Computer and Communications Security, CCS'03, Oct. 2003, 10 pages.
Ernesto Damiani et al., "Key Management for Multi-User Encrypted Databases," Proceedings of the 2005 ACM Workshop on Storage Security and Survivability, StorageSS'05, Nov. 2005, 10 pages.
Ernesto Damiani et al., "Metadata Management in Outsourced Encrypted Databases," Proceedings of the 2nd VLDB Workshop on Secure Data Management, SD'05, Sep. 2005, 17 pages.
Sabrina De Capitani di Vimercati et al., "Over-encryption: Management of Access Control Evolution on Outsourced Data," Proceedings of the 33rd International Conference on Very Large Data Bases, VLDB'07, Sep. 2007, pp. 123-134.
Sabrina De Capitani Di Vimercati et al., "Encryption Policies for Regulating Access to Outsourced Data," ACM Transactions on Database Systems, vol. 35, Issue 2, Apr. 2010, 56 pages.
C Changyu Dong et al., "Shared and Searchable Encrypted Data for Untrusted Servers," Proceedings of Data and Applications Security XXII, 22nd Annual IFIP WG 11.3Working Conference on Data and Applications Security, DAS 2008, Lecture Notes in Computer Science 5094, Jul. 2008 , pp. 127-143.
Markus Eurich et al., "The impact of perceived privacy risks on organizations' willingness to share item-level event data across the supply chain," Electronic Commerce Research, 10:3-4, Dec. 2010, pp. 423-440.
Benjamin Fabian et al., "Security Analysis of the Object Name Service," Proceedings of the International Workshop on Security, Privacy and Trust in Pervasive and Ubiquitous Computing, SECPERU'05, Jul. 2005, 6 pages.
K. Finkenzeller, "RFID Handbook: Fundamentals and Applications in Contactless Smart Cards and Identification," John Wiley & Sons, Inc., 2003, 434 pages.
H. Hacigümüs and S. Mehrotra, "Performance-Conscious Key Management in Encrypted Databases," Proceedings of the 18th IFIP Conference on Data and Applications Security, DBSEC, Jul. 25-28, 2004, pp. 95-109.
H. Hacigumus et al., "Executing SQL over Encrypted Data in the Database-Service-Provider Model," Proceedings of the International Conference on Management of Data and Symposium on Principles Database and Systems, SIGMOD'02, Jun. 2002, 12 pages.
H. Hacigumus et al., "Providing Database as a Service," Proceedings of the 18th International Conference on Data Engineering, ICDE, Feb.-Mar. 2002, 10 pages.
H. Hacigümüs et al., Ensuring the Integrity of Encrypted Databases in the Database-as-a-Service Model, Proceedings of the 17th IFIP Conference on Data and Applications Security, DBSEC, Aug. 4-6, 2003, pp. 61-74.
H. Hacigumus et al., Efficient Execution of Aggregation Queries over Encrypted Relational Databases, Proceedings of the 9th International Conference on Database Systems for Advances Applications, DASFAA, Mar. 2004, LNCS 2973, pp. 125-136.
Bijit Hore et al., "A Privacy-Preserving Index for Range Queries," Proceedings of the 30th International Conference on Very Large Data Bases, VLDB'04, Aug.-Sep. 2004, pp. 720-731.
Geetha Jagannathan et al., "Private Inference Control for Aggregate Database Queries," Proceedings of the Seventh IEEE International Conference on Data Mining—International Workshop on Privacy Aspects of Data Mining, Oct. 2007, 6 pages.
Florian Kerschbaum, "An Access Control Model for Mobile Physical Objects," Proceedings of the 15th ACM Symposium of Access Control Models and Technologies, SACMAT'10, Jun. 2010, 10 pages.
Florian Kerschbaum et al., "Privacy-Preserving Pattern Matching for Anomaly Detection in RFID Anti-Counterfeiting," Proceedings of the Radio Frequency Identification: Security and Privacy Issues—6th International Workshop, RFIDsec'10, Jun. 2010, 16 pages.
Adam Melski et al., "Managing RFID data in supply chains," International Journal of Internet Protocol Technology (IJIPT), 2(3/4):176-189, 2007.
Einar Mykletun et al., "Authentication and Integrity in Outsourced Databases," Proceedings of the Network and Distributed System Security Symposium NDSS'04, 2004.
Brian L. Dos Santos et al., "RFID in the Supply Chain: Panacea or Pandora's Box?," Communications of the ACM, 51(10):127-131, Oct. 2008.
Sanjay Sarma et al., "Radio Frequency Identification and the Electronic Product Code," IEEE Micro, 21(6):50-54, 2001.
Radu Sion, "Strong WORM," Proceedings of the 28th International Conference on Distributed Computing Systems ICDCS'08, Jun. 2008, 8 pages.
Dawn Xiaodong Song et al., "Practical Techniques for Searches on Encrypted Data," Proceedings of IEEE Symposium on Security and Privacy, S&P'00, May 2000, 12 pages.
Leonardo Weiss Ferreira Chaves et al., "Industrial Privacy in RFID-based Batch Recalls," Proceedings of the International Workshop on Security and Privacy in Enterprise Computing, SPEC'08, Sep. 2008, 7 pages.
Peter Williams et al., "Building Castles out of Mud: Practical Access Pattern Privacy and Correctness on Untrusted Storage," Proceedings of the ACM Computer and Communications Security Conference, CCS'08, Oct. 2008, 10 pages.
Y.J. Yang et al., Multi-User Private Queries over Encrypted Databases, Proceedings of International Journal of Applied Cryptography, 1(4):309-319, 2009.
E. Yuan and J. Tong. "Attributed Based Access Control (ABAC) for Web Services." Proceedings of the IEEE International Conference on Web Services, ICWS'05, Jul. 11-15, 2005, 9 pages.

* cited by examiner

REAL-TIME ASSET TRACKING USING DISCOVERY SERVICES

BACKGROUND

An enterprise uses a supply chain to transform and move a product or service from one or more suppliers (entities, partners or companies) to a customer in a manufacturing process. The supply chain is a system that can involve various organizations and people inside and outside of the enterprise. Additionally, the supply chain can utilize technologies, activities, and information to transform natural resources, raw materials and components from the one or more suppliers into a finished product that can be delivered to customer.

As the product makes its way through the supply chain, the enterprise may move the product between various suppliers. The suppliers can share product related data along the supply chain. However, the suppliers may want to maintain the confidentiality of information related to the product movement and transformation as the enterprise moves the product between suppliers. This is particularly relevant in an ad hoc supply chain with dynamically changing suppliers. The enterprise can determine the trade-off between the need to share information along the supply chain and the non-proliferation of confidential information to competitors or others outside of the supply chain. Sharing information between suppliers along the supply chain can result in each supplier providing additional services that benefit the manufacture of the product. The sharing of information can also result in manufacturing process optimizations and improvements resulting in reduced manufacturing costs.

SUMMARY

Implementations of the present disclosure include methods of sharing data in a supply chain, the data corresponding to an item having a tag associated therewith. In some implementations, methods include actions of storing item-level data in a computer-readable repository, determining endpoint data associated with the item-level data, the endpoint data indicating a location of the item-level data, determining a random number from the tag, the random number being unique to the item, selecting a first integer and a second integer, generating a first public key based on the first integer and a semi-public key based on the second integer, generating an identifier based on the first public key and the random number, generating a key based on the semi-public key and the random number, encrypting the endpoint data using the key to provide encrypted endpoint data, defining a tuple comprising the identifier and the encrypted endpoint data, and transmitting the tuple over a network for storage in a persistent storage device.

In some implementations, actions further include generating a value based on the semi-public key and the random number, wherein generating the encryption key is based on a pseudo-random function that maps the value to the key.

In some implementations, actions further include providing the first public key to a second party, the second party seeking access to the encrypted data.

In some implementations, actions further include transmitting the semi-public key to a second party, the second party seeking access to the encrypted endpoint data.

In some implementations, actions further include transmitting the random number to the second party.

In some implementations, actions further include generating a third integer, generating a second public key based on the first integer, the third integer, and the random number, and transmitting the second public key over the network for storage in the persistent storage device, the second public key used by the persistent storage device to determine the storing of the tuple.

In some implementations, a first party generates the key and transmits the key to a second party to enable the second party to access to the tuple for the item.

In some implementations, a first party generates the key and the identifier and transmits the key and the identifier to a second party to enable the second party to access data corresponding to items that the second party possessed.

In some implementations, the first party generates the key and the identifier and transmits the key and the identifier to a second party to enable the second party to access data corresponding to items that the first party possessed.

In some implementations, the tag includes a machine-readable medium comprising at least one of a the machine-readable medium, such as radio frequency identification (RFID) data, in a 2-dimensional (2D) bar code, and/or in a QR code.

Implementations of the present disclosure include methods of sharing data in a supply chain, the data corresponding to an item having a tag associated therewith. In some implementations, methods include actions of receiving at least one of a key and a semi-public key from a second party, identifying a public key associated with the second party, generating a query based on a random number, the random number being unique to the item, transmitting the query over a network to a third party, receiving, from the third party, one or more tuples identified by the third party based on the query, each tuple of the one or more tuple comprising respective encrypted endpoint data, and decrypting the encrypted endpoint data based on at least one of the key and the semi-public key to provide endpoint data.

In some implementations, actions further include generating a request for item-level data associated with the item, and transmitting the request based on a location indicated by the endpoint data.

In some implementations, actions further include receiving, in response to the request, the item-level data.

In some implementations, actions further include determining an identifier based on the public key and a random number, the random number being unique to the item, the query including the identifier.

In some implementations, actions further include generating a value based on the random number, the query including the value.

In some implementations, the first party generates the key and transmits the key to a second party to enable the second party to access to the tuple for the item.

In some implementations, actions further include the first party generates the key and the identifier and transmits the key and the identifier to a second party to enable the second party to access to data corresponding to items that the second party possessed.

In some implementations, actions further include the first party generates the key and the identifier and transmits the key and the identifier to a second party to enable the second party to access data corresponding to items that the first party possessed.

In some implementations, actions further include the tag includes a machine-readable medium comprising at least one of a the machine-readable medium, such as radio frequency identification (RFID) data, in a 2-dimensional (2D) bar code, and/or in a QR code.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
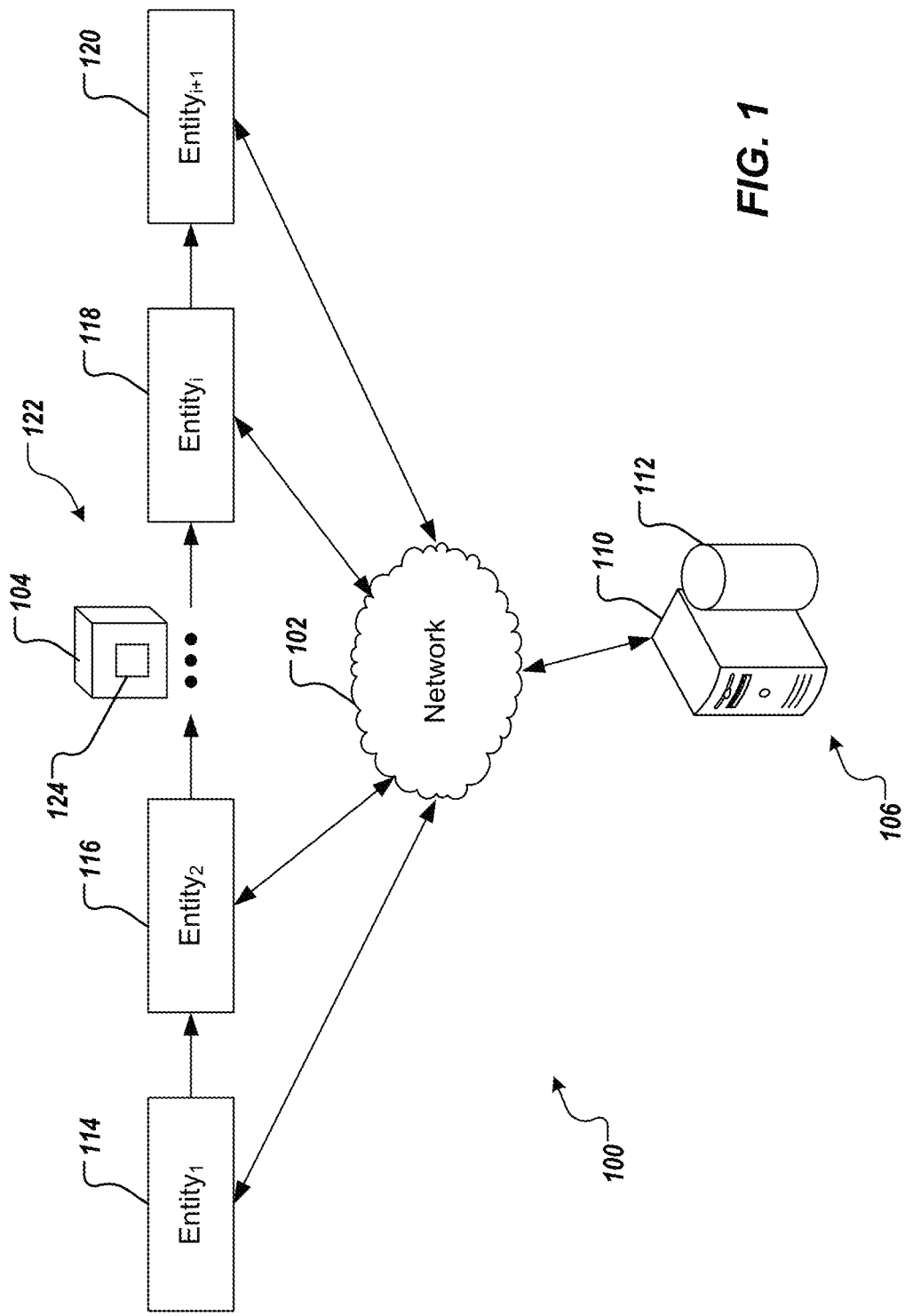
FIG. 1 is a block diagram of an example system architecture that can execute implementations of the present disclosure.

Implementations of the present disclosure are generally directed to enabling item level services through secure sharing of data within a supply chain. An enterprise may optimize their supply chain by sharing or exchanging item-level data that includes specific data regarding each item used in the manufacture of a product with other entities or companies in the supply chain that may use the same item. More particularly, implementations of the present disclosure are directed to a distributed repository architecture that includes a discovery service, and an encryption scheme. In some examples, endpoint data that points to respective locations (e.g., data repositories) where item-level data is stored can be encrypted using the encryption scheme and can be made available to entities through a third-party discovery service. In accordance with the present disclosure, the encryption scheme enables the enforcement of item-level access control by the data owner, is efficient in the number of keys required by the data owner, and is confidential even with respect to the third-party providing the discovery service.

In some implementations, endpoint data is partitioned and tuples corresponding to a particular item are spread across a number of data repositories. For example, each entity can store item-level data (e.g., that the entity generates) in an entity-specific repository. In some examples, an entity can submit a query (e.g., to the third-party discovery service), which can be used to search for locations of item-level data corresponding to a particular item (e.g., in all data repositories of the distributed repository architecture).

The use of item-level tracking by an entity for items in their supply chain may enable the entity to collect information regarding the item from a machine-readable medium (e.g., by scanning an RFID tag or 2D bar code for the item). Although implementations of the present disclosure are discussed with respect to storing item information on a machine-readable medium, it is appreciated that the item information can be printed as to be human readable. The machine-readable medium can provide a sequence of elements that include a unique identifier for the item, a timestamp, and location and situation specific data for the item. The entity can record or store the elements in a "tuple" as item-level data in a local data repository associated with the entity. Consequently, a plurality of local data repositories can be provided, each local data repository being associated with a specific entity that is a member of the supply chain. In accordance with implementations of the present disclosure, entities can enforce access control to the item-level data by other entities in the supply chain. Entities in the supply chain sharing data may need to gain access to data provided by multiple enterprises.

In some implementations, an entity can encrypt endpoint data and transmit the encrypted endpoint data for storage in a central repository. The encrypted endpoint data can be provided to other entities in a supply chain. In some examples, endpoint data can identify a data endpoint where item-level data is stored. In some examples, the endpoint data can identify a location where certain data can be queried. In some examples, the endpoint data can include a uniform resource indicator (URI) (e.g., a uniform resource locator (URL) that provides an address of a website or web service), an Internet protocol (IP) address of a file transfer protocol (FTP) server, and/or the name, address and/or telephone number of a person or entity.

In some examples, the central repository can be provided as cloud storage included in a cloud computing system hosted by a third party (e.g., a service provider). The cloud storage service provider can manage and maintain the central repository where entities can store encrypted endpoint data that is associated with particular items for sharing with and access by other entities. Encrypting the endpoint data stored in a cloud-based data repository enables the data owner to determine and enforce eventual access control to item-level data as only entities that have knowledge of a private key for use in decrypting the endpoint data are able to read the endpoint data stored in the cloud-based data repository. In some implementations, the service provider might not be aware of the private key. As such, the service provider is unable to decrypt the encrypted endpoint data and additionally would not be able to distribute the private key, intentionally or unintentionally, to any entities. In this manner, the confidentiality of the stored endpoint data can be maintained.

Sharing and exchanging of item-level data among entities in the supply chain can enable the use of various applications for analysis of the data. For example, anti-counterfeiting applications, supply chain benchmarking applications and applications that identify target batch recalls can use the shared item-level data to provide information to the entities in the supply chain.

FIG. 1 is a block diagram of an example system 100 that can execute implementations of the present disclosure. The system 100 enables n number of entities (examples of which are entities 114, 116, 118, 120) access, by way of a network 102, to a central computer 106 that includes a central database 112 and a central server 110. In some examples, the central computer 106 can represent one or more computing systems (e.g., server systems) that can be geographically local to one another or can be geographically distributed. In some examples, an entity can include a member of an enterprise (e.g., multiple entities working together in a common effort). An example entity can include a company. An example enterprise can include a supply chain (e.g., multiple entities working together to provide an end product). In the example of FIG. 1, an entity (e.g., entities 114, 116, 118, 120) can be a company, partner, organization or supplier located in a supply chain 122. For example, entity 114 is located before entity 116 in the supply chain 122. Entity 118 is located before entity 120 in the supply chain 122. The supply chain 122 manufactures item 104. The item 104 along with any additional components can be introduced to each entity in the supply chain 122 during the manufacturing process. In the example of FIG. 1, the finished item will be output by entity 120 for subsequent delivery to a customer.

The item 104 can include an attached machine-readable medium. In some implementations, a random number r may be encoded in the machine-readable medium, such as radio frequency identification (RFID) data, in a 2-dimensional (2D) bar code, and/or in a QR code included with the item. As discussed in further detail herein, the random number r is associated with the particular item and can be used to uniquely identify the item and corresponding endpoint data stored in a repository provided by the third-party discovery service.

In the illustrated example, the machine-readable medium includes an RFID tag 124. A unique identification number can be stored on the RFID tag 124 for the item 104. Each entity along the supply chain 122 can generate and associate item-level data with the item 104 as it is manufactured, or otherwise process by the respective entity. The item-level data can be associated with the item's unique identification number for storage in a local repository of the respective entity.

In some implementations, the central computer 106 is located at an external service provider. Endpoint data that are to be shared among entities in the supply chain 122 can be encrypted and stored in the central database 112. Each entity in the supply chain (the n entities in the supply chain 122) can provide the shared endpoint data to the external service provider. In addition, the external service provider can manage access to the shared endpoint data. For example, the central database 112 may be cloud storage and the central computer 106 may be a cloud computing system hosted by a third party or service provider. The cloud storage service provider can manage and maintain the central database 112 where the entities 114, 116, 118, 120 can store encrypted endpoint data for sharing and exchanging among the entities 114, 116, 118, 120.

Each entity (e.g., entities 114, 116, 118, 120) can encrypt and store endpoint data for an item used by the supply chain 122 in the manufacture of the product 104 in the central database 112. The central database 112 can include a unique identification number for each item and one or more tuples for the item where each tuple includes endpoint data provided by an entity in the supply chain. In some implementations, the random number r included in the RFID tag (described with reference to FIG. 2) or 2D bar code for the item can be the item's identification number. The identification number can be used as an index into the database that includes all of the endpoint data for the item.

Each entity in the supply chain (the n entities in the supply chain 122) can outsource their encrypted endpoint data to the external service provider. The entity that owns the endpoint data can manage the access to the encrypted endpoint data by other entities as well as the service provider by using and maintaining encryption keys. This can enable entities and enterprises the ability to provide an encryption scheme related to outsourced database security and searchable encryption that can be used by multiple entities and enterprises.

Security requirements for the central database 112 can prevent a party observing the central database 112 from tracking items in the central database 112. The security requirements can prevent an attacker that continuously monitors the central database 112 from determining any information with regard to the data stored in the central database 112. In addition, the entity that owns the data (the data owner) included in the central database 112 can enforce various levels of access control to the endpoint data for its items. For example, regarding item 104, the data owner can provide access control to endpoint data for item 104 to another entity based on their level of trust with the other entity.

Specifying fine-granular access control for endpoint data, and ultimately item-level data, can become unmanageable. Consequently, entities can implement a visibility policy model to efficiently specify access control to one or more other entities. In some examples, a visibility policy can be provided as an extension of attribute-based access control (ABAC). In ABAC, the decision as to whether access to particular data is granted can be determined based on attributes of subject, object and environment. In some examples, for each subject, object or environment, there is an assignment ATTR( ) of a subset of the attributes. A policy rule can be provided as a Boolean function of the attributes of subject, object and environment of the request. If the function evaluates to true, given the assignment of attributes, access is granted. Otherwise access is denied.

In some implementations, in item-level sharing, subjects can be entities and objects can be items. In some examples, an entity (subject) can request access to data of a specific item (object). Access can be granted, for example, if the item (object) has been in possession of the entity (subject). In this manner, visibility policies implement a combined subject, object attribute. For example, ATTR(s, o) can be an assignment function of combined subject, object attributes for subject s and object o. If object o has been in possession of subject s, then "vis"∈ATTR(s, o). Policy rules efficiently implementing visibility policies can be provided. For example, a policy rule granting access to all supply chain partners, but excluding a competitor "Charlie," can be provided as:

access(s,o)="vis"∈ATTR(s,o) ∧ "Charlie"∉ATTR(s)

In some implementations, in a first access level (A1), a data owner can provide individual access to an entity for each tuple of endpoint data stored for the item 104 in the central database 112. The first level of data access control enables the data owner to set the access level to each individual tuple of the endpoint data.

In some implementations, in a second access level (A2), a data owner can provide an entity access to all tuples of endpoint data for an item that the entity at one time possessed. The data owner can allow or restrict the visibility of items on an item-by-item basis to other entities that at one time may have had possession of the item. This can allow one entity (e.g., the data owner) to provide endpoint data access to other entities without having to set individually the access control of each tuple of the endpoint data to each individual entity. For example, entities, including the data owner, may then engage in fair data sharing agreements for an item with one another without the risk of disclosing sensitive or confidential information, either directly or by inference, regarding each individual item or entity.

In some examples, the second access level (A2) provides a basic notion of visibility policies combined with an authorization for a specific entity. An example, second access level authorizing access by a specific entity, "Alice," can expressed as:

$$access(s,o) = \text{"vis"} \in ATTR(s,o) \wedge \text{"Alice"} \in ATTR(s)$$

Such visibility policies can be implemented using tuple-level access control, while significantly reducing the number of managed keys.

In some implementations, in a third access level (A3), a data owner can provide an entity access to all tuples of endpoint data previously possessed by the data owner. For example, the data owner can use the third level (A3) of access control to allow trusted third parties (e.g., outsourced manufacturers, service providers or other third parties) full access to all tuples of the endpoint data. In the case where the central database 112 may be cloud storage and the central computer 106 may be a cloud computing system hosted by a third party or service provider, the third access level (A3) may be used between a data owner and the service provider in order for the service provider to manage and maintain the central database 112.

In some examples, the third access level (A3) implements access control orthogonal to visibility policies based on the ownership of the data in ones data repository. Using an example, the entity "Alice" can the service provider and the entity "Bob" can be the entity granting access to data. The third access control level (A3) can be expressed based on the following example:

$$access(s,o) = \text{"Bob"} \in ATTR(o) \wedge \text{"Alice"} \in ATTR(s)$$

In accordance with the present disclosure, each entity can utilize cryptographic processes and algorithms to enable the secure handling of endpoint data among entities. Cryptography involves the design and analysis of mathematical techniques that can enable secure communications in the presence of malicious adversaries. The use of cryptographic processes and algorithms by a data owner can prevent unwanted entities from accessing endpoint data stored in a central repository. In some implementations, symmetrical encryption can involve communicating entities to agree on secret and authentic keying material for use in encrypting and decrypting data exchanged between the communicating entities. For example, symmetrical encryption can be used for each tuple of data exchanged between the communicating entities. In some implementations, asymmetrical encryption can use a public-key scheme where communicating entities exchange keying material that is authentic but not secret. Each entity selects a single key pair that includes the public key and a related private key kept secret by the entity. A key pair can be associated with each tuple of data exchanged between entities. The use of symmetrical and asymmetrical encryption, as described, assumes a key or key pair for each tuple for each entity. Entities, when sharing data, would exchange a key or key pair for each tuple of data shared. For example, a supply chain may produce millions of items utilizing hundreds of supply chain partners (entities) resulting in the use of a large number of cryptographic keys, as a cryptographic key for each tuple would be exchanged between entities for each entity.

In some implementations, and in order to reduce the number of cryptographic keys while enabling the secure handling of endpoint data among entities, a cryptographic scheme can use the random number r as the unique identifier for an item along with two cryptographic keys. Communicating entities can perform a one-time exchange of cryptographic keys where new or additional items or tuples would not need an exchange of new cryptographic keys between the communicating entities. In addition, the encrypted endpoint data can be stored in a central repository accessible by both trusted and untrusted entities, but protected from access by any untrusted entities and even the third party service provider.

Figure 2:
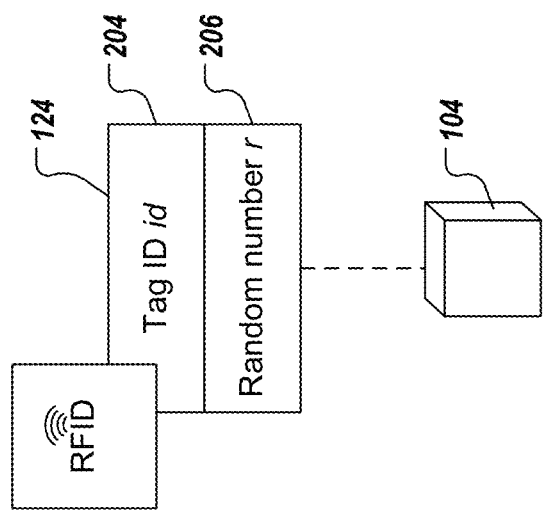
FIG. 2 is a diagram of example data that can be provided from a tag associated with an item.

FIG. 2 is a diagram of example data that can be provided from a machine-readable medium (e.g., RFID tag 124) associated with an item 104. The RFID tag 124 can include a unique tag identifier id 204 that remains unchanged throughout the supply chain. Random number r 206 can be a unique number associated with the item 104. For example, the random number r 206 can be written to the RFID tag 124 during the manufacturing process. An entity in possession of the item 104 can access and read the id 204 and the random number r 206 from the RFID tag 124. During a manufacturing process, data can be accumulated during each value added step in the supply chain. Each entity along the supply chain can store the data accumulated during the value added step performed by the entity in the supply chain as item-level data. As discussed in further detail below, each entity can store the item-level data in a local data repository.

In some implementations, the item 104 may include, alternatively or in addition to the RFID tag 124, a 2D barcode or other non-electronic tracking method. In these implementations, a unique identifier for the item 104 may also be the random number r associated with the item 104 and encoded in the 2D barcode.

Tuples (I, D) in a cryptographic scheme can include two values: a unique identifier, I, representative of the combination of one item with one entity, and encrypted endpoint data D. The unique identifier, I, for the item can be used to locate and identify the encrypted endpoint data D within the central repository. For example, the unique identifier, I, can be used as an index to a data table of encrypted endpoint data included in a database or central repository. The unique identifier, I, can be used to query for the encrypted endpoint data D from the central repository.

Figure 3:
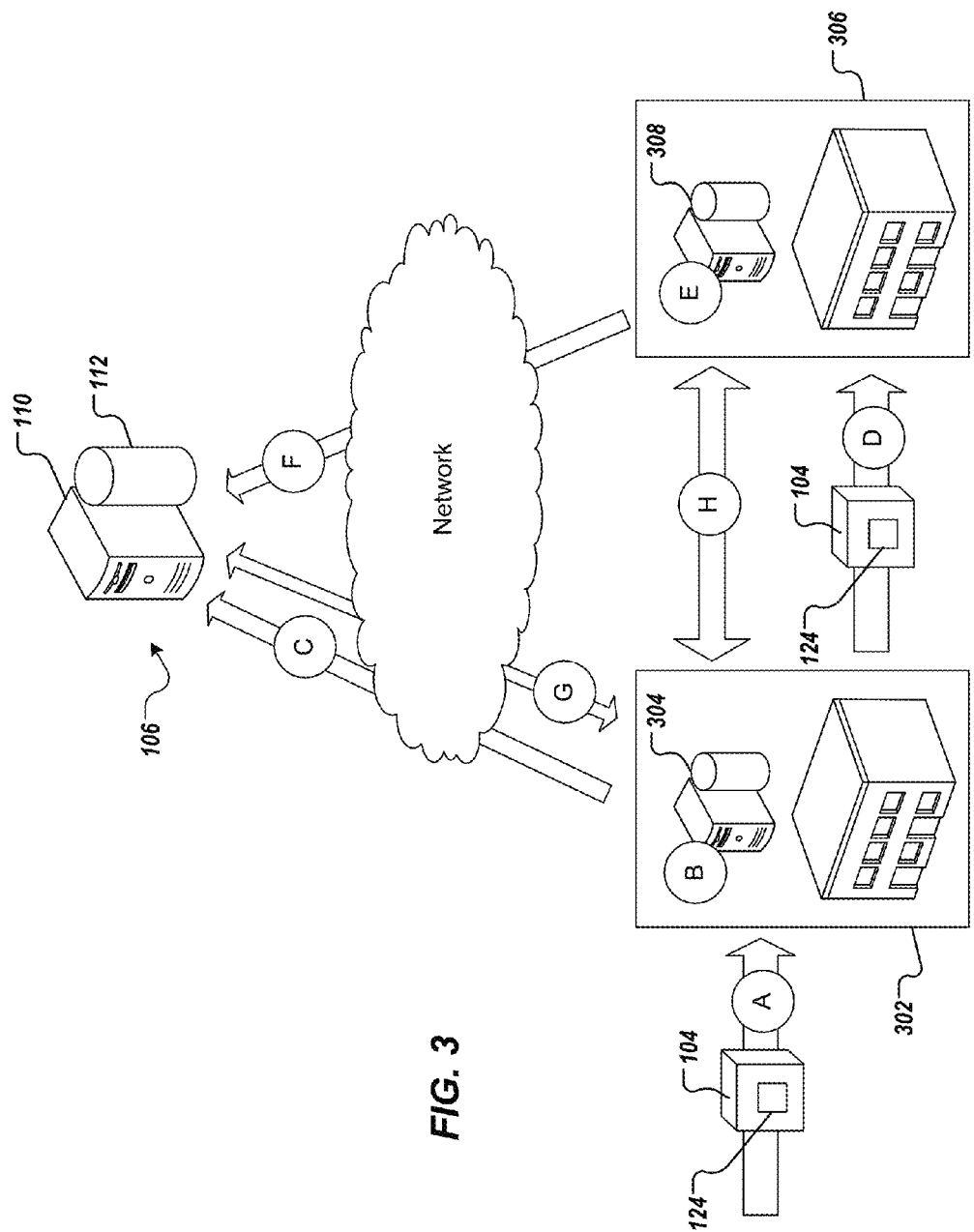
FIG. 3 is a diagram depicting example steps for secure sharing of item-level data in accordance with the present disclosure.

FIG. 3 is a diagram depicting example steps for secure sharing of item-level data in accordance with the present disclosure. For example, an entity 302 receives or produces the item 104 that includes the RFID tag 124 (step A). The entity 302 collects first item-level data regarding the item 104 and stores the first item-level data in a local repository 304 (step B). The entity 302 encrypts first endpoint data that reflects the location of the first item-level data and stores the encrypted first endpoint data in the central database 112 of the central computer 106 (step C) in the form of tuples (I, D). The entity 302 forwards the item 104 to an entity 306 (step D). The entity 306 collects second item-level data regarding the item 104 and stores the second item-level data in a local repository 308 (step E). The entity 306 encrypts second endpoint data that reflects the location of the second item-level data and stores the encrypted second endpoint data in the central database 112 of the central computer 106 (step F) in the form of tuples (I, D).

The entity 302 can submit a query to the service provider (to the computer 106) requesting encrypted endpoint data associated with the particular item and can receive the encrypted endpoint data in response (step G). For example, the entity 302 can receive the encrypted second endpoint data provided by the entity 306. The entity 302 can decrypt the encrypted second endpoint data to read the second endpoint data. By reading the second endpoint data, the entity 302 can become aware that item-level data is available from the entity 306 and/or that item-level data is stored in the repository 308. The entity 302 can request item-level data from the entity 306 (step H). In response, the entity 306 can authenticate the entity 302 (e.g., determine whether the entity 302 is allowed access to the item-level data) and can provide the second item-level data to the entity 302 (step H).

Similarly, the entity 306 can submit a query to the service provider (to the computer 106) requesting encrypted endpoint data associated with the particular item and can receive the encrypted endpoint data in response. For example, the entity 306 can receive the encrypted first endpoint data provided by the entity 302. The entity 306 can decrypt the encrypted first endpoint data to read the first endpoint data. By reading the first endpoint data, the entity 306 can become aware that item-level data is available from the entity 302 and/or that item-level data is stored in the repository 304. The entity 306 can request item-level data from the entity 302. In response, the entity 302 can authenticate the entity 306 (e.g., determine whether the entity 306 is allowed access to the item-level data) and can provide the second item-level data to the entity 306.

In some implementations, a cryptographic scheme can use the random number r 206 included on the RFID tag 124 for the item 104 in order to identify the item 104. Each entity that may possess the item 104 at any time can access the random number r 206, for example, by scanning the RFID tag 124. For example, g, an accumulator function, can be a generator of cyclic group $G_p$ of prime order p. The Decisional Diffie-Hellman (DDH) assumption holds true in G. The DDH assumption is a computational hardness assumption regarding a particular problem related to discrete logarithms in cyclic groups. It can be assumed that the DDH problem in $G_p$ is difficult.

For example, if given values $g, g^a, g^b, g^c \in G$, it is not computationally feasible to determine whether $c=ab$. For example, entity 302 can be referred to as company i. Company i selects two private keys, $a_i$ and $b_i$, in the multiplicative group of prime integers, $Z^*_p$. Company i can use the two private keys, $a_i$ and $b_i$, to compute a public key $g^{a_i}$ and a semi-public key $g^{b_i}$. Company i collects endpoint data x that reflects a location of stored item-level data regarding item 104, where item 104 can be identified by random number r. Company i computes a public key for the item 104 as $g^{a_i r}$ and a semi-public key for the item 104 as $g^{b_i r}$. A pseudo-random function (PRF) can map $G_p$ to encryption keys. For example, $E_K$ can denote encryption in a symmetrical encryption scheme using key K. Company i can store the endpoint data x in the central database 112 as encrypted data D using the computed keys as an index to the location in the central database 112 based on the unique identifier I, where (I, D)= $(g^{a_i r}, E_{PRF(g^{b_i r})}(x))$.

Figure 4:
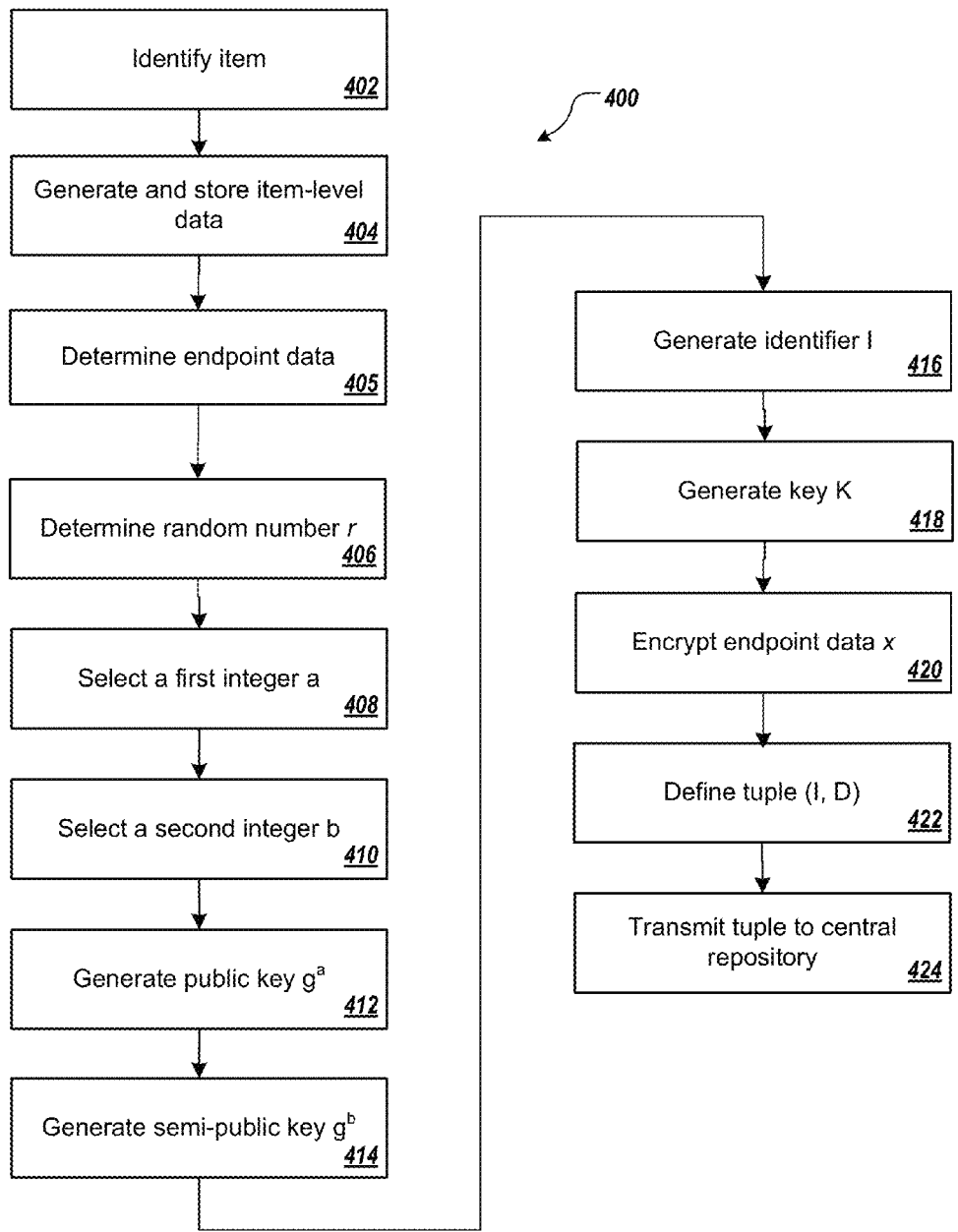
FIG. 4 is a flowchart illustrating an example process that can be executed to encrypt endpoint data for storage in a central database.

FIG. 4 is a flowchart illustrating an example process 400 that can be executed to encrypt endpoint data for storage in a central database. The process 400 can be described with reference to FIGS. 1, 2 and 3. The process 400 can be provided by one or more computer programs that are executed using one or more computing devices.

The process 400 begins by identifying an item (402). Item-level data associated with the item can be generated and stored (404). For example, a company or the data owner (the entity 302 which can be referred to as company i) can be in possession of the item and can generate and store item-level data associated with the item in a local repository (e.g., the repository 304). Endpoint data x associated with the stored item-level data is generated (405). A random number r is determined (406). For example, the entity 302 scans the RFID tag 124 to determine the random number r 206 associated with the item 104.

A first integer, a, is selected (408). A second integer, b, is selected (410). For example, in preparing to encrypt the endpoint data x in a tuple, the entity 302 selects a first integer, a, and a second integer, b, where a and b are included in the multiplicative group of prime integers, $Z^*_p$. A public key, $g^a$, is generated (412). A semi-public key, $g^b$, is generated (414). For example, an accumulator function, g, can be a generator of cyclic group $G_p$ of prime order p where $g, g^a, g^b, g^c \in G$. In some examples, steps 408, 410, 412 and 414 are performed during a setup stage. Consequently, and in such examples, the steps 408, 410, 412 and 414 are not repeated for each item.

An identifier, I, is generated (416). For example, the entity 302 can generate identifier $I=g^{a\,r}$ for the item 104. A key K is generated (418). For example, the entity 302 can generate a key K where $E_K$ can denote encryption in a symmetrical encryption scheme using key K and a pseudo-random function (PRF) can map $G_p$ to the encryption key K. The entity 302 can generate a public key for the item 104 as $g^{ar}$ and a semi-public key for the item 104 as $g^{br}$. Endpoint data is encrypted (420). For example, company 302 can encrypt the endpoint data x using the key K resulting in encrypted endpoint data $D=E_{PRF(g^{b\,r})}(x)$. A tuple is defined (422). For example, the tuple (I, D) is defined equal to $(g^{a_i r}, E_{PRF(g^{b_i r})}(x))$. The tuple is transmitted to the central repository (424). For example, the entity 302 transmits the tuple (I, D) to the central computer 106 for storage in the central database 112. The process 400 ends.

In some implementations, a third party can select the first and second integers and can generate the public key and the semi-public key. For example, the third party can generate the encryption information and provide the encryption information to each of the entities involved in the supply chain.

In some examples, and referring again to FIGS. 1 and 3, in order for the entity 306 (which can be referred to as company i+1) to access and decrypt the encrypted endpoint data, company i+1 obtains access privileges from the entity 302 (also referred to as company i). Company i can grant access to the stored encrypted endpoint data in the central database 112 to company i+1 at one of the previously described access levels.

In some implementations, company i may grant company i+1 access to the stored encrypted endpoint data for item 104 at a first access level (A1). Company i, the data owner, reveals and shares the semi-private key $g^{b_i r}$ for a specific tuple of endpoint data for the item 104. Company i+1 calculates identifier, $I=(g^{a_i})^r$ using the public key $g^{a_i}$ and the random number r associated with the item 104. Company i+1 may query the central database 112 for the tuple (I, D) located at the index in the database using identifier I. Company i+1 can receive the encrypted endpoint data from the central database 112 and can decrypt the encrypted endpoint data D in the tuple (I, D) using the semi-private key $g^{b_i r}$.

For example, referring again to FIGS. 1 and 2, in order for the entity 306 to access the tuple (I, D) stored to the central database 112 by the entity 302, the entity 306 needs to know the random number r 206 for the item 104. For example, the entity 306 can determine the random number r 206 for the item 104 by scanning the RFID tag 124 on the item 104 once the entity 306 purchases, receives, or is otherwise in possession of the item 104. The entity 306 can determine the public key $g^{a_i r}$ for the item 104 based on the public key $g^{a_i}$.

In some examples, the entity 306 can obtain the public key $g^{a_i}$ by various means. For example, the entity 306 can access a web site for the entity 302 that may provide the public key $g^{a_i}$ to download or in the form of a certificate. In another example, the entity 306 can obtain the public key $g^{a_i}$ by direct contact with the entity 302. For example, the entity 302 can electronically transmit (e.g., via email) the public key $g^{a_i}$ to the entity 306. The entity 306 can use the public key $g^{a_i r}$ as an index into the central database 112 in order to locate the encrypted endpoint data $D=E_{PRF_{(g^b_i)^r}}(x)$, where x is the decrypted endpoint data. The entity 302 can reveal the semi-public key $g^b_i$ to the entity 306, for example, after the entity 306 purchases the item 104 from the entity 302. The entity 306 can calculate the semi-private key $g^{b_i r}$ for the item 104 by using the random number r 206 associated with the item 104. The entity 306 can calculate $E_{PRF}$ using the semi-public key $g^{b_i r}$ in order to obtain the endpoint data x.

In some implementations, company i may grant company i+1 access to the stored encrypted endpoint data D the item 104 at a second access level (A2). Company i, the data owner, reveals and shares the semi-public key $g^b_i$. Company i+1 can compute key $K=PRF((g^b_i)^r)$ and identifier $I=(g^{a_i})^r$ for all tuples (I, D) for the item 104 using the random number r associated with the item 104. Company i+1 can query each tuple (I, D) located at the index in the database using the identifier I. Company i+1 can receive the encrypted endpoint data D and can decrypt the encrypted endpoint data D using the key K for each item identified by identifier I.

In some implementations, company i can grant company i+1 access to the stored encrypted endpoint data for item 104 at a third access level (A3). Company i, the data owner, reveals and shares the semi-public key $g^b_i$ and the random number r for all endpoint data previously possessed by the data owner. For each item, company i+1 can query the tuple located at the index in the database using the identifier I for each item. Company i+1 can receive the encrypted endpoint data D and can decrypt the encrypted endpoint data D using the key K for each item identified by identifier I. For example, company i+1 may be a service provider for a cloud computing system that may manage the data stored in cloud storage included in the cloud computing system.

Figure 5:
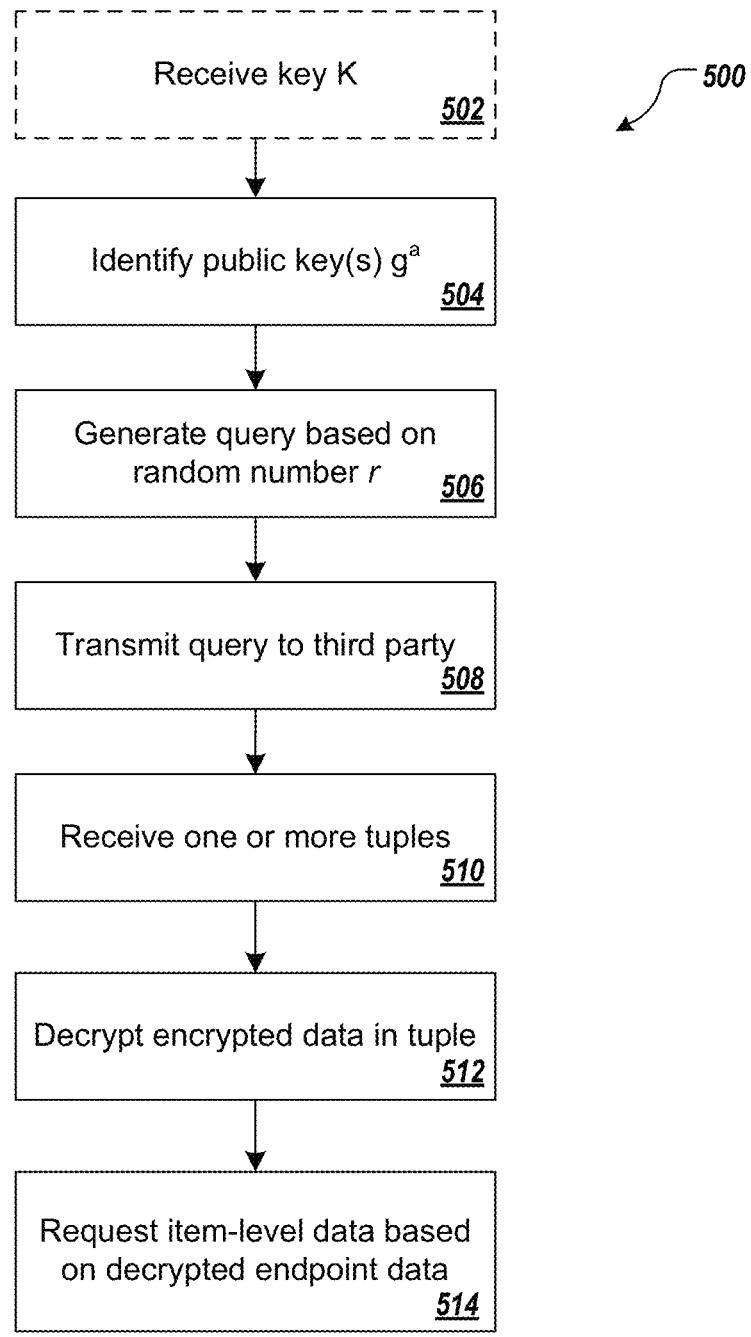
FIG. 5 is a flowchart illustrating an example process that can be executed to decrypt endpoint data stored in a central database.

FIG. 5 is a flowchart illustrating an example process 500 that can be executed to decrypt endpoint data stored in and retrieved from a central database. The process 500 can be described with reference to FIGS. 1, 2 and 3. The process 500 can be provided by one or more computer programs that are executed using one or more computing devices.

In some examples, the process 500 can begin by receiving a key K (502). For example, is a first access level (A1) is being granted, the key K can be received. For example, the entity 306, which can be referred to as company i+1, can receive the item 104 from the entity 302, which can be referred to as company i. The entity 302 can determine the access level to grant to the entity 306 for the endpoint data stored in the central database 112. The key provided by the entity 302 to the entity 306 can be based on the access level granted.

One or more public keys $g^{a_i}$ are identified (504). For example, the entity 306 can obtain the public key $g^a$ for the entity 302 by various means previously described. For example, if the entity 302 grants the entity 306 a first access level (A1), the entity 302 reveals a key $K=PRF((g^b)^r)$ to the entity 306 for the specific item 104 associated with the random number r. For example, if the entity 302 grants the entity 306 a second access level (A2), the entity 302 reveals a semi-public key $g^b$. The entity 306 can compute key $K=PRF$ $((g^b)^r)$ and identifier $I=(g^a)^r$ for all tuples (I, D) for the item 104 using the random number r associated with the item 104. A query is generated based on the random number r (506). For example, the entity 306 can query each tuple (I, D) located at the index in the database using the identifier I for the item 104 associated with the random number r. The query is transmitted to a third party (508). For example, a client-side computing device included in the entity 304 can transmit the query by way of network 102 to the central computer 106. For example, the central computer 106 may be a cloud computing system that includes cloud storage. The cloud computing system may be managed by a third party or service provider. One or more tuples are received (510). For example, as a result of the query central computer 106 can return one or more tuples (e.g., tuple (I, D)) for the item. The encrypted endpoint data D can be decrypted (512). For example, the entity 306 can use the keys determined in the previous steps to decrypt the encrypted endpoint data D included in a tuple (I, D) to determine the item-level data x. Item-level data can be requested based on the decrypted endpoint data (514). For example, the entity 306 can determine the location of item-level data based on the endpoint data and can submit a request (e.g., to the entity 302) for access to the item-level data.

In some cases, an entity having access to multiple items in the central database 112 could result in the entity forging entries for the data owner for the items it can access. For example, company i+1, knowing the public and semi-private keys along with the random number r, can determine the identifier I to locate the encrypted data D. As company i+1 can decrypt the endpoint data, company i+1 can also encrypt endpoint data and store the encrypted endpoint data at the index in the central database 112 identified by the identifier I. In order to preserve the integrity of the encrypted data, company i can further maintain a private key $c_i$. For example, let h be a generator of group $G'_p$ also of prime order p. When the data owner stores the encrypted data $(E_{PRF_{(g^b_i)^r}}(x))$ at the index for the identifier I $(g^{a_i r})$ in the central database 112, the data owner also provides the key $h^{a_i c_i r}$ to the central database 112. For example, public key $h^{c_i}$ can be a public key for company i. In order to verify the integrity of the data provided by the data owner, the central database can use a bilinear map. A bilinear map is a function ê: $G \times G' \rightarrow G_T$. The bilinear map is bilinear for $g \in G$ and $h \in G'$. The function ê exhibits the following property where $ê(g^a, h^b)=ê(g, h)_{ab}$. The bilinear map is non-degenerate as $ê(g, h) \neq 1$ is a generator of $G_T$. The bilinear map is computable, as there is an efficient algorithm to compute ê(g, h) for all $g \in G$ and $h \in G'$. It may be assumed that the Symmetric External Diffie-Hellman (SXDH) assumption in G and G' holds. Examples of bilinear maps that exhibit the characteristics and properties described are Modified Weil or Tate pairings on super-singular elliptic curves. The central database 112 verifies that $ê(g^{a_i r}, h^{c_i})=ê(g, h^{a_i c_i r})$. Once the bilinear map function is verified, the central database 112 can allow company i to write data to the database location. For example, the SXDH assumption holds as there exists a bilinear map ê: $G \times G' \rightarrow G_T$ and the DDH assumption holds in G and G'.

In order for an entity to obtain the encrypted endpoint data D for a particular item of interest, the entity needs to have information regarding the item (e.g., the random number r associated with the item). For example, referring to FIG. 3, if the entity 306 (company i+1) wants to obtain the endpoint data for the item 104 from the central database 112, the entity 306 can query the central database 112 for the item 104. In some implementations, the entity 306 might not know that the entity 302 (company i) possessed the item 104. The entity 306 queries the central database 112 to obtain the encrypted endpoint data D before decrypting the endpoint data D.

For example, let C be a set of all entities that may have possessed an item (e.g., all companies in a particular industry segment). Company i can generate a tuple of the form (I, D)=($g^{a_i r}$, $E_K(x)$), where company i is included in the set of all entities (i∈C) and $E_K$ can denote encryption in a symmetrical encryption scheme using key K. The entity 306 (company i+1), knowing the random number r 206 associated with the item 104 (e.g., by reading the RFID tag 124), can query the central database 112 for the endpoint data tuple associated with the random number r 206. The database query can be performed in a number of different ways.

In some implementations, a client-side computing device can perform calculations to obtain the encrypted endpoint data D from a central repository. Each entity included in the set of entities that may have possessed an item (i∈C) can use a public key $g^{a_i}$ to calculate an identifier I=$g^{a_i r}$ for the item where the random number r is associated with the item. The company can use the identifier I as an index into the central repository to retrieve the corresponding encrypted endpoint data D from the central repository.

For example, referring to FIG. 3, the entity 306 (company i+1) can include a client-side computing device (not shown) that can communicate with the central computer 106 by way of the network 102 to obtain the encrypted endpoint data D from the central database 112. The client-side computing device can use the public key $g^{a_i}$ to calculate the identifier I=$g^{a_i r}$ for the item associated with the random number r. The entity 306 can use the calculated identifier I as an index into the central database 112 to retrieve the corresponding encrypted endpoint data D from the central database 112. The central server 110 included in the central computer 106 can use the identifier I as the index into the central database 112. The central server 110 parses all data included in the central database 112 in order to obtain the encrypted endpoint data D.

In some implementations, a server-side computing device can perform calculations to obtain the encrypted endpoint data D from a central repository. Each entity included in the set of entities that may have possessed an item (i∈C) can calculate $g^r$ as the company knows the random number r associated with the item of interest. The entity can provide $g^r$ to the server-side computing device. The server-side computing device can query the central repository for all endpoint data for the entities included in the set of entities C. This can be a subset of all of the data stored in the central repository. Using the public key $g^{a_i}$ and $g^r$ provided by the entity, the server-side computing device can return the encrypted endpoint data D for the case where $\hat{e}(g^r, g^{a_i})=\hat{e}(g, g^{a_i r})$.

For example, referring to FIG. 3, the entity 306 (company i+1) can include a client-side computing device (not shown) that can communicate with the central computer 106 by way of the network 102 to obtain the encrypted endpoint data D from the central database 112. The client-side computing device can calculate $g^r$ as the entity 306 knows the random number r associated with the item of interest. For example, the client-side computing device can read the RFID tag 124 for the item 104 to determine the random number r 206, where the item 104 is the item of interest. The client-side computing device included at the entity 306 can provide $g^r$ to the central computer 106 by way of network 102. The central server 110 included in the central computer 106 can query the central database 112 for all endpoint data for the entities included in the set of entities C. This can be a subset of all of the data stored in the central database 112. Using the public key $g^{a_i}$ and $g^r$ provided by the client-side computing device, the central server 110 can return the encrypted endpoint data D to the client-side computing device for the case where $\hat{e}(g^r, g^{a_i})=\hat{e}(g, g^{a_i r})$.

In some implementations, the identifier I of the tuple of the predecessor entity P (company i−1) and the identifier I of the tuple of the successor entity S (company i+1) can additionally be encrypted and stored in the tuple for the current entity (company i). For example, company i can store (I, D, P, S)=($g^{a_i r}$, E(x), $E(g^{a_{i-1} r})$, $E(g^{a_{i+1} r})$) for an item with the associated random number r using the public key $g^{a_i}$ and the random number r for the item. Each entity included in the set of entities C (i∈C), with appropriate access rights to the data included in the central database 112, can follow the endpoint data for an item of interest associated with the random number r up and down the supply chain as it transitions from one entity to another. For example, the predecessor entity P (company i−1) can sell, or otherwise provide the item to the current entity (company i) that can then sell, or otherwise provide the item to the successor entity S (company i+1)). The entity can obtain the endpoint data for the particular item by querying the central repository for endpoint data for the item by following the item along the supply chain and accumulating the endpoint data in a chaining process. Using the chaining process for obtaining endpoint data can require a client-side computer included in the company performing the query to decrypt the endpoint data at each step along the supply chain in order to determine the next query to perform. Using the chaining process, the server-side computing device need not parse all of the data in the central repository in order to determine the endpoint data for the particular item.

For example, referring to FIG. 3, the entity 306 can include a client-side computing device (not shown) that can communicate with the central computer 106 by way of the network 102 to obtain the encrypted endpoint data D from the central database 112. The client-side computing device can know the random number r associated with the item of interest. For example, the client-side computing device can read the RFID tag 124 for the item 104 to determine the random number r 206, where the item 104 is the item of interest. The client-side computing device included in the entity 306 can provide the random number r to the central computer 106 by way of network 102. The central server 110 included in the central computer 106 can query the central database 112 to determine (I, D, P, S) ($g^{a_i r}$, E(x), $E(g^{a_{i-1} r})$, $E(g^{a_{i+1} r})$) for an item with the associated random number r using the public key $g^{a_i}$ and the random number r for the item. The entity 306 having the appropriate access rights to the encrypted endpoint data D included in the central database 112 can follow the endpoint data for an item of interest associated with the random number r up and down the supply chain as it transitions from one entity to another. Using this process for obtaining endpoint data can include a client-side computer at the entity 306 to perform the query to decrypt the endpoint data at each step along the supply chain in order to determine the next query to perform. In some implementations, the entity 306 may be a company along the supply chain.

In some implementations, if an entity queries for tuples corresponding to one item located in cloud storage included in a cloud computing system hosted by a third party or service provider, the service provider might try to infer which tuples belong to the item, and thus infer the length of the supply chain. In some cases, inferring by the service provider of the length of the supply chain may be avoided by querying the tuples of many items at once or by including random tuples from other items in the query.

Each process for performing a database query to obtain the encrypted endpoint data D can be beneficial dependent on system configuration and performance requirements. For example, having a client-side computing device use the public key $g^a_i$ to calculate the identifier $I=g^{a_i r}$ for the item associated with the random number r places the burden of the calculation of the identifier I on the client-side computing device. In some implementations, the client-side computing device might not perform the calculation efficiently. In addition, once the server-side computing device receives the identifier I, the server-side computing device parses the entire central repository to determine the encrypted endpoint data D for the item with the identifier I. This may involve parsing data in the central repository for entities not included in the set of entities C, where (i∈C). In some implementations, the server-side computing device may provide parallelism in order to decrease the time needed to parse the central repository to determine the encrypted endpoint data D for the item with the identifier I. Parallelism can involve the use of multiple processing devices in parallel to perform a certain task thereby decreasing the run time for the performance of the task (e.g., the parsing and fetching of data from a central repository). In some cases, the database included in the central repository may be replicated in order to perform parallelization where the runtime for fetching tuples may decrease by a factor of n when fetching 1/n of all tuples in parallel from n computing devices with the same data.

When using the chaining process to retrieve endpoint data tuples for a particular item, the runtime of the chaining process may be dependent on the amount of time it takes the server-side computing device to fetch the identified tuples from the central repository along with the amount of time it takes the server-side computing device to decrypt the (I, D) for the tuple of the previous entity $P(g^{a_i r}, E(g^a_{i-1} {}^r))$ and the (I, D) for the tuple for the successor entity S $(g^{a_i r}, E(g^a_{i+1} {}^r))$. In addition, the amount of time it takes the server-side computing device to fetch the identified tuples and to decrypt the (I, D) for the tuples of the previous entity P and the successor entity S increases linearly with the size of the number of entities that possessed the item associated with the random number r. For each entity that possessed the item, where the entity is included in the set of all entities that possessed the item, the server-side computing device fetches one tuple from the central repository and decrypts two values: the (I, D) for the tuple of the previous entity P and the (I, D) for the tuple of the successor entity S. As described with respect to the server-side computing device parsing the database using the identifier I as an index to fetch the endpoint data tuples for the item, the use of parallelization in the chaining process may not decrease the runtime needed as each step to find and fetch a tuple needs data from the previous step. Therefore, though the chaining process may parse a subset of the data included in the database (e.g., the endpoint data for only one item as it moves through the supply chain), parallelization may improve the performance of the data parsing and fetching processes that parse the entire database as the computational burden can be distributed among multiple computers by replicating the database and fetching the tuples in parallel.

Figure 6:
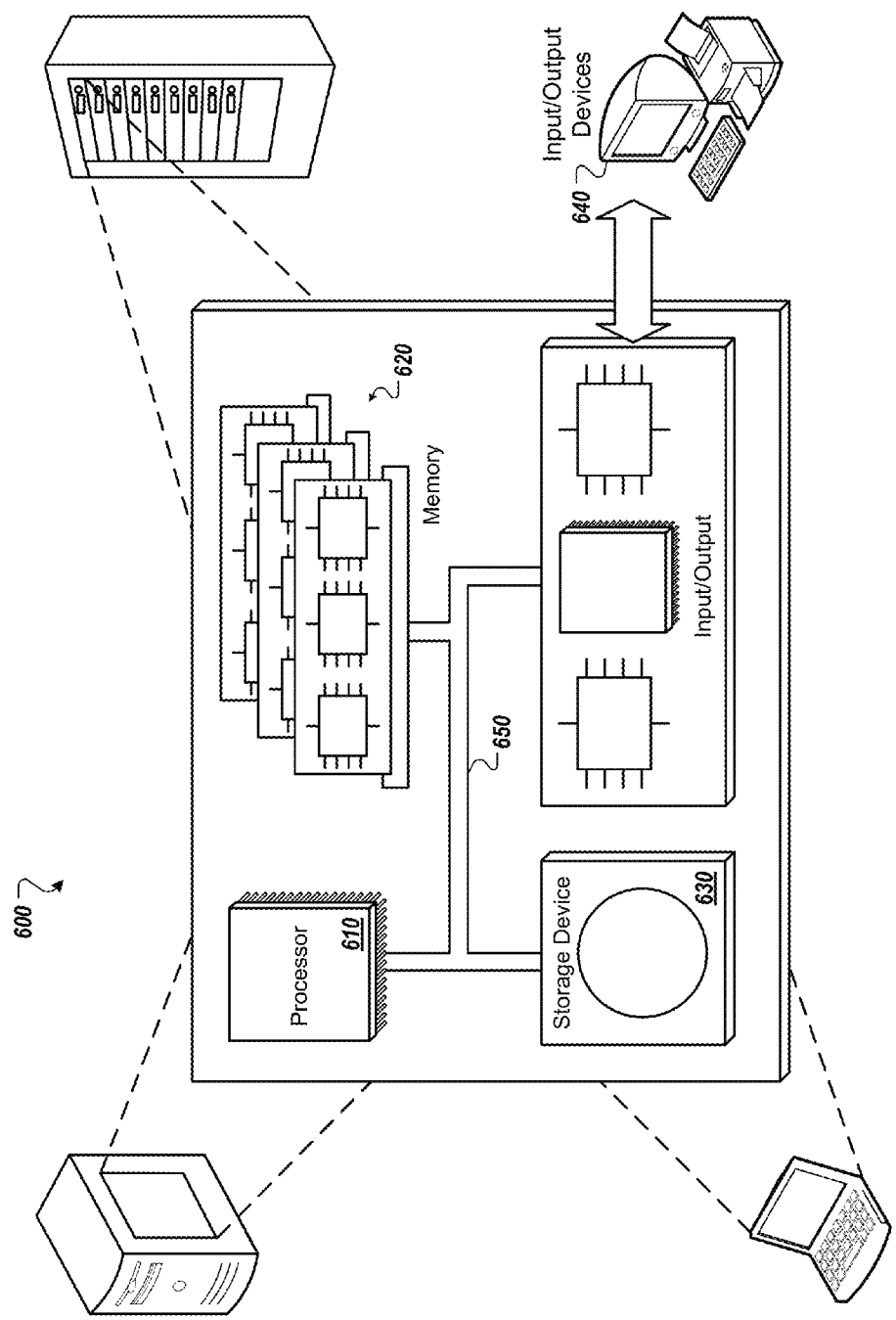
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of sharing data in a supply chain, the data corresponding to an item having a tag associated therewith, the method comprising:
    storing, by one or more processors, item-level data in a computer-readable repository of a first entity, the item-level data being associated with the item and being generated by the first entity;
    determining, by the one or more processors, endpoint data associated with the item-level data, the endpoint data indicating a location where the item-level data is stored in the computer-readable repository of the first entity;
    determining, by the one or more processors, a random number from the tag, the random number being encoded on the tag and being unique to the item;
    selecting, by the one or more processors, a first integer and a second integer;
    generating, by the one or more processors, a first public key based on the first integer and a semi-public key based on the second integer, the first public key comprising authentic keying material that is not secret and is exchanged with a plurality of entities communicating with the first entity and the semi-public key being shared with one or more of the plurality of entities in association with a purchase of the item;
    generating, by the one or more processors, an identifier based on the first public key and the random number;
    generating, by the one or more processors, a key based on the semi-public key and the random number;
    encrypting, by the one or more processors, the endpoint data using the key to provide encrypted endpoint data;
    defining, by the one or more processors, a tuple comprising the identifier and the encrypted endpoint data; and
    transmitting the tuple over a network for storage in a persistent storage device that is accessible by one or more second entities of the supply chain for submitting queries to retrieve the encrypted endpoint data to access the item-level data from the computer-readable repository of the first entity.

2. The method of claim 1, further comprising generating a value based on the semi-public key and the random number, wherein generating the key is based on a pseudo-random function that maps the value to the key.

3. The method of claim 1, further comprising providing the first public key to a second party, the second party seeking access to the encrypted data.

4. The method of claim 3, further comprising transmitting the semi-public key to a second party, the second party seeking access to the encrypted endpoint data.

5. The method of claim 4, further comprising transmitting the random number to the second party.

6. The method of claim 1, further comprising:
    generating a third integer;
    generating a second public key based on the first integer, the third integer, and the random number; and
    transmitting the second public key over the network for storage in the persistent storage device, the second public key used by the persistent storage device to determine the storing of the tuple.

7. The method of claim 1, wherein a first party generates the key and transmits the key to a second party to enable the second party to access to the tuple for the item.

8. The method of claim 1, wherein a first party generates the key and the identifier and transmits the key and the identifier to a second party to enable the second party to access data corresponding to items that the second party possessed.

9. The method of claim 1, wherein the first entity generates the key and the identifier and transmits the key and the identifier to the one or more second entities to enable the one or more second entities to access data corresponding to items that the first entity possessed.

10. The method of claim 1, wherein the tag comprises a machine-readable medium comprising at least one of a radio frequency identification (RFID) tag, a 2-dimensional (2D) bar code, and/or a QR code.

11. A computer-implemented method of sharing data in a supply chain, the data corresponding to an item having a tag associated therewith, the method comprising:
    receiving, by one or more processors, at least one of a key and a semi-public key from a second party, the semi-public key being shared with one or more parties in the supply chain in association with a purchase of the item;
    identifying, by the one or more processors, a public key associated with the second party, the public key comprising authentic keying material that is not secret and is exchanged with a plurality of parties in the supply chain communicating with the second party;
    generating, by the one or more processors, a query based on a random number, the random number being encoded on the tag and being unique to the item;
    transmitting, by the one or more processors, the query over a network to a third party that is accessible by entities of the supply chain for submitting queries to retrieve encrypted endpoint data;
    receiving, from the third party, one or more tuples identified by the third party based on the query, each tuple of the one or more tuple comprising respective encrypted endpoint data to access item-level data from a computer-readable repository of a first party, the item-level data being associated with the item and being generated by the first party; and decrypting, by the one or more processors, the encrypted endpoint data based on at least one of the key and the semi-public key to provide endpoint data, the endpoint data indicating respective locations where the item-level data is stored in the computer-readable repository of the first party.

12. The method of claim 11, further comprising:
generating a request for item-level data associated with the item; and
transmitting the request based on a location indicated by the endpoint data.

13. The method of claim 12, further comprising receiving, in response to the request, the item-level data.

14. The method of claim 11, further comprising determining an identifier based on the public key and a random number, the random number being unique to the item, the query comprising the identifier.

15. The method of claim 11, further comprising generating a value based on the random number, the query comprising the value.

16. The method of claim 11, wherein the first party generates the key and transmits the key to a second party to enable the second party to access to the tuple for the item.

17. The method of claim 11, wherein the first party generates the key and the identifier and transmits the key and the identifier to a second party to enable the second party to access to data corresponding to items that the second party possessed.

18. The method of claim 11, wherein the first party generates the key and the identifier and transmits the key and the identifier to a second party to enable the second party to access data corresponding to items that the first party possessed.

19. The method of claim 11, wherein the tag comprises a machine-readable medium comprising at least one of a the machine-readable medium, such as radio frequency identification (RFID) data, in a 2-dimensional (2D) bar code, and/or in a QR code.

20. A system for sharing data in a supply chain, the data corresponding to an item having a tag associated therewith, the system comprising:

one or more computers; and a computer-readable medium coupled to the one or more computers having instructions stored thereon which, when executed by the one or more computers, cause the one or more computers to perform operations comprising:

storing item-level data in a computer-readable repository of a first entity, the item-level data being associated with the item and being generated by the first entity;

determining endpoint data associated with the item-level data, the endpoint data indicating a location where the item-level data is stored in the computer-readable repository of the first entity;

determining a random number from the tag, the random number being encoded on the tag and being unique to the item;

selecting a first integer and a second integer;

generating a first public key based on the first integer and a semi-public key based on the second integer, the first public key comprising authentic keying material that is not secret and is exchanged with a plurality of entities communicating with the first entity and the semi-public key being shared with one or more of the plurality of entities in association with a purchase of the item;

generating an identifier based on the first public key and the random number;

generating a key based on the semi-public key and the random number;

encrypting the endpoint data using the key to provide encrypted endpoint data;

defining a tuple comprising the identifier and the encrypted endpoint data; and transmitting the tuple over a network for storage in a persistent storage device that is accessible by one or more second entities of the supply chain for submitting queries to retrieve the encrypted endpoint data to access the item-level data from the computer-readable repository of the first entity.

* * * * *